(No Model.)
N. T. WHITING.
DEVICE FOR SUPPLYING WATER TO VESSELS.
No. 456,320. Patented July 21, 1891.
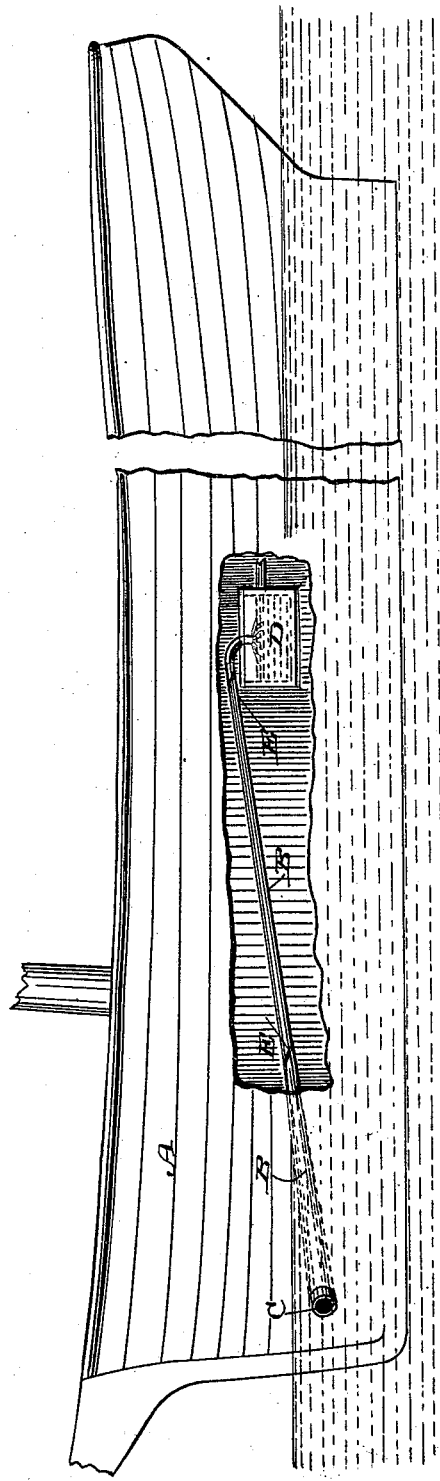
Witnesses,
Inventor,
Nathaniel T. Whiting
By Dewey & Co.
attys

UNITED STATES PATENT OFFICE.

NATHANIEL T. WHITING, OF SAN FRANCISCO, CALIFORNIA.

DEVICE FOR SUPPLYING WATER TO VESSELS.

SPECIFICATION forming part of Letters Patent No. 456,320, dated July 21, 1891.

Application filed August 7, 1890. Serial No. 361,367. (No model.)

*To all whom it may concern:*

Be it known that I, NATHANIEL T. WHITING, a citizen of the United States, residing in the city and county of San Francisco, State of California, have invented an Improvement in Devices for Supplying Water to Vessels; and I hereby declare the following to be a full, clear, and exact description of the same.

My invention relates to a device for supplying water to vessels. It is especially applicable for the purpose of supplying salt-water in large quantities to be used on steamers in connection with the condensers, and also for other purposes where necessary on such vessels.

It consists of an inclined pipe or pipes opening outward at or near the bow of the vessel, inclining gradually upward from that point to the point of discharge and provided with check-valves.

Referring to the accompanying drawings for a more complete explanation of my invention, the figure is a side view of a vessel with a portion of the side broken away, showing the arrangement of my device.

Large quantities of water are necessary for the purpose of condensing the steam used in steam-vessels, and this water is usually supplied by pumps, to actuate which steam must be supplied from the boilers, and more or less waste of power thus takes place.

In my invention, A represents the hull of a vessel. B is a pipe, having an enlarged or expanded mouth-opening at or near the bow of the vessel, as shown at C, and in the direction toward which the ship is being propelled. I have shown this pipe as being made with an expanded mouth, which is fixed so as to be water-tight where it passes through the vessel, and at a point sufficiently below the surface of the water to remain submerged except in case of great roughness of the sea. This pipe tapers and grows smaller within the body of the vessel and is supported at a small angle, as shown, extending inwardly to a point where it may deliver water either directly to the condensers of the engines or primarily into a tank or receiver D, from which water may be delivered by a constant overflow to the condensers.

Within the pipe B, I fix check-valves E, which open inwardly, but will close at any time upon a considerable reduction of the exterior pressure, so as to prevent water which is already within the pipe from flowing backward into the sea in case the movements of the vessel should momentarily raise the mouth of the pipe above the surface of the water. At the high rate of speed which is usually obtained by steamers the water will be forced to rush into the mouth of this pipe and up the gradual incline until it reaches a point sufficiently above the condensers to deliver the water to them, from whence, after use, it may be discharged again in the usual manner. It will be manifest that the pressure within this pipe or pipes will be constant as long as the vessel is in motion, and no power but that will be needed to raise all the water that is necessary for this purpose and for washing decks and other kindred purposes about such vessels. The contraction of the pipe from its outer end toward the point of delivery enables me to introduce a large quantity of water, and the momentum will be increased as it progresses by reason of the smaller diameter of the pipe through which the water must flow.

The valves E are of any well-known pattern which will raise easily and present no obstruction to the inward flow of the water, but they will close promptly upon any check in the inward flow or tendency to return.

Another valve may be fitted to the outer end of the pipe or pipes to prevent the ingress of water when not desired, or when the vessel is running where there are foreign substances which it is desired to keep from entering the pipes.

Having thus described my invention, what I claim as new, and desire to secure by Letters Patent, is—

As a means for supplying water to condensers of vessels, the combination therewith of a pipe having an enlarged or expanded mouth opening near the forward portion of the vessel beneath the surface of the exterior water, said pipe being gradually contracted in diameter from its mouth rearwardly and extending upward and backward from that point to the point of discharge within the receptacle within the vessel and provided with one or more suitable check-valves, substantially as herein described.

In witness whereof I have hereunto set my hand.

NATHANIEL T. WHITING.

Witnesses:
S. H. NOURSE,
H. C. LEE.